Nov. 24, 1953 C. W. WULFF 2,660,129

TRUCK DAMPING DEVICE

Filed Jan. 6, 1950 5 Sheets-Sheet 1

INVENTOR.
Cal W. Wulff
BY
Mann and Brown
Att'ys.

Nov. 24, 1953

C. W. WULFF 2,660,129

TRUCK DAMPING DEVICE

Filed Jan. 6, 1950

5 Sheets-Sheet 2

INVENTOR.
Cal W. Wulff
BY
Mann and Brown
Attys.

LOAD-DEFLECTION CURVE
CONSTANT RATE SPRING

LOAD - DEFLECTION CURVE
VARIABLE RATE SPRING

CRITICAL FREQUENCY
CURVE

FRICTION PRESSURE CURVES
FOR CONVENTIONAL STABILIZERS

FRICTION PRESSURE CURVE
NON LINEAR RATE

INVENTOR.
Carl W. Wulff
BY Mann and Brown
Att'ys.

Nov. 24, 1953  C. W. WULFF  2,660,129

TRUCK DAMPING DEVICE

Filed Jan. 6, 1950  5 Sheets-Sheet 4

INVENTOR.
Cal W. Wulff
BY
Mann and Brown
Att'ys

Nov. 24, 1953 C. W. WULFF 2,660,129
TRUCK DAMPING DEVICE
Filed Jan. 6, 1950 5 Sheets-Sheet 5

INVENTOR.
Carl W. Wulff
BY
Mann and Brown
Attys.

Patented Nov. 24, 1953 2,660,129

UNITED STATES PATENT OFFICE 2,660,129

TRUCK DAMPING DEVICE

Cal W. Wulff, Chicago, Ill., assignor to Holland Company, a corporation of Illinois Application January 6, 1950, Serial No. 137,121

22 Claims. (Cl. 105—197)

This invention relates to spring suspensions for vehicles, and particularly to railway car trucks of the type in which friction means are built into the truck to dampen the movements of the truck bolster relative to the truck frame. The present application is a continuation-in-part of my earlier application, filed May 16, 1947, Serial No. 748,526, and the disclosure of that application is incorporated herein by reference to the extent that it is not inconsistent with the present disclosure.

A great variety of damping devices are employed in railway car trucks now in service, and generally stated they are designed to apply either a constant friction force, or one which increases or decreases at some specified constant rate in response to bolter loading. In other words, when wedge constructions are employed, as is common, the angle of the wedge, plus the compression of the wedge spring, determines the rate of friction pressure increase or decrease, and a rate which may be appropriate for a given portion of the bolster travel is often totally unsuited for some other portion of the bolster travel.

The present invention has for its principal object to provide friction means for damping bolster movements, both vertical and transverse, which differ from conventional damping devices in that the friction forces may be of varying rate so that the damping effect of the entire device is correlated to the actual damping forces needed at different spring deflections for smooth travel. In some cases, the damping effect may be related to the critical frequency curve of the bolster springs; in other cases, it may be desirable to build into the device an entirely different damping rate.

Further objects and advantages of the invention will become apparent as the disclosure proceeds and the description is read in conjunction with the accompanying drawings, in which Fig. 1 is a side elevational view showing a railway truck equipped with a preferred form of the invention;

Figures 5, 6:
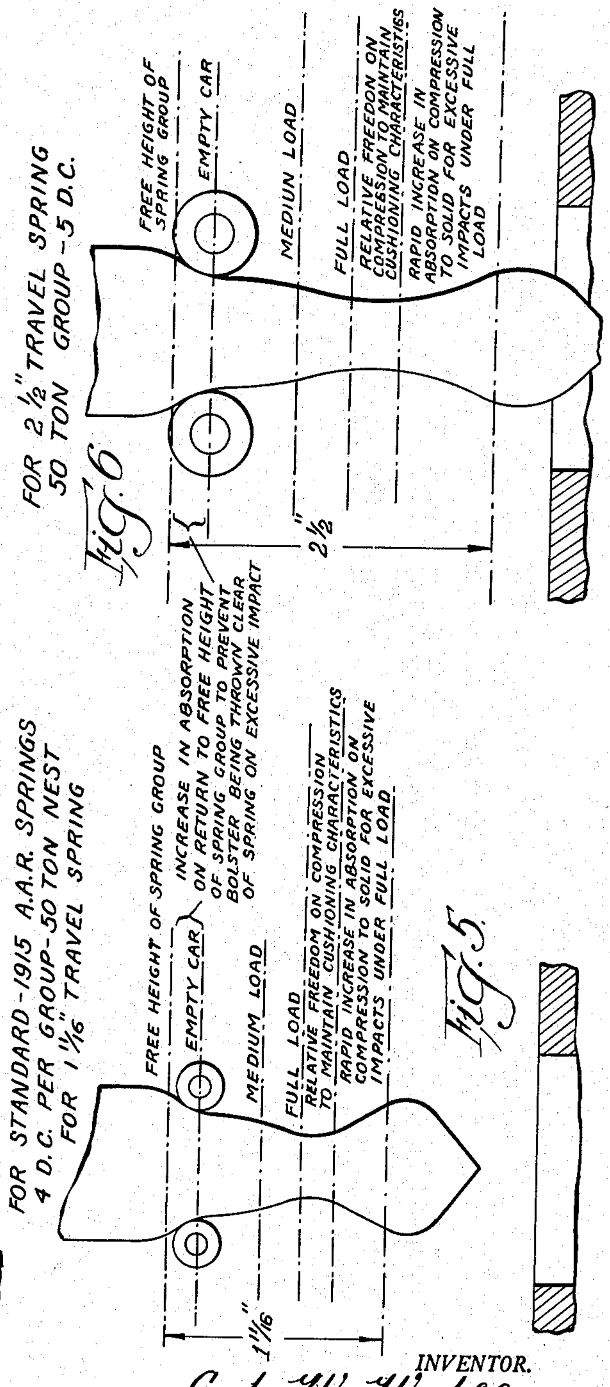
Figure 17:
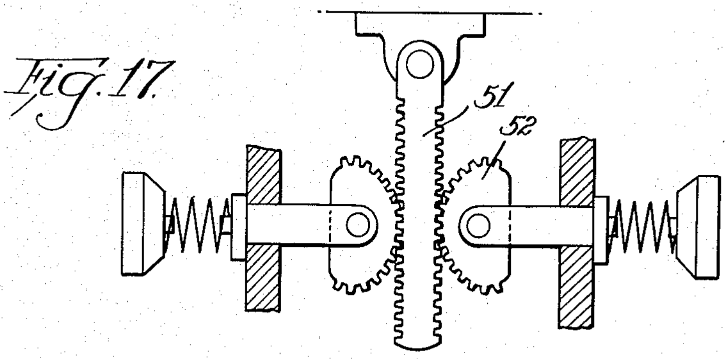
Figure 18:
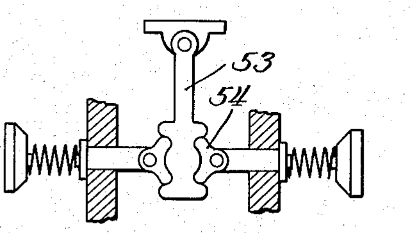
Figure 19:
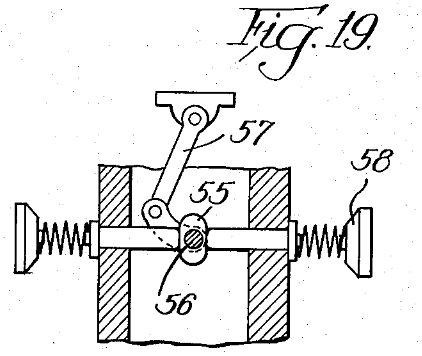

Fig. 5 is a diagrammatic representation of a cam track which may be advantageously used in connection with standard 1915 A. A. R. springs of $1\frac{11}{16}$ inches total travel;

Fig. 6 is a similar representation for 2½ inches total spring travel;

Figs. 7 to 11, inclusive, are graphical illustrations, each appropriately labeled, which will be used in explaining the present invention;

Figs. 12 to 16, inclusive, show various modifications of the invention;

Fig. 17 shows a further modification of the device having a rack cooperating with specially shaped pinion gears;

Fig. 18 shows an arrangement in which rolling cams are employed to obtain the varying rate of friction pressure;

Fig. 19 shows a still further modification of the invention; and

Figure 20:
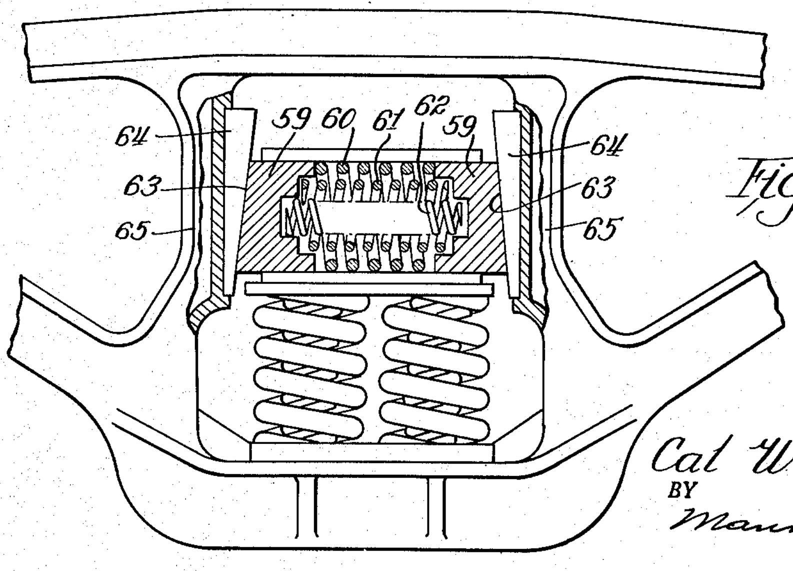

Fig. 20 shows how different springs may be employed to obtain a series of different damping rates, although not of infinitely variable character.

It will be understood that once the teachings of the present invention are clearly understood, persons skilled in the art will readily find other means to accomplish the objects of this invention, and for that reason, the appended claims should be construed as broadly as the prior art will permit.

In my prior application, hereinbefore referred to, one of the desired objects of the invention was to have the friction force of the damping device related to the natural frequency of vibration of the bolster springs. While this is a desirable relationship for some applications of the invention, the important consideration is that any type of varying rate or nonlinear function may be built into the damping device, within the disclosure of the invention, to obtain desired damping action. It is even possible to combine constant rate damping with variable rate damping for selected portions of the bolster travel if desired. In other words, the present invention is characterized by its versatility in providing any desired damping effect for selected portions of bolster travel or truck loading.

Figure 1:
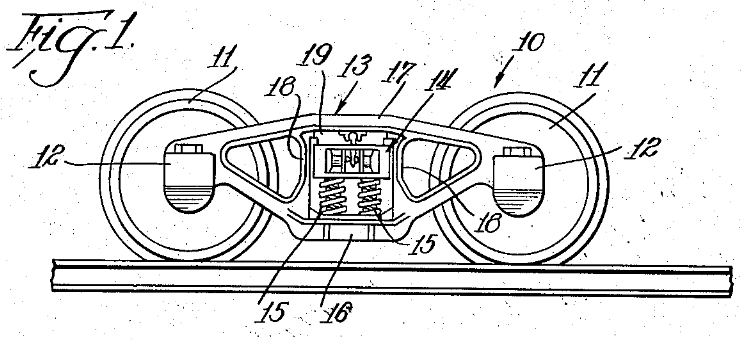

In Fig. 1 of the drawings, 10 indicates a car truck having wheels 11 mounted on axles which are journaled in journal boxes 12 integral with truck side frames 13. A bolster 14 has its ends supported in bolster openings in the side frames by helical truck or bolster springs 15. The drawing should be understood to represent A. A. R. standard design of a railway car truck, or modifications to accommodate longer travel springs.

Each side frame includes a lower tension member 16, an upper compression member 17 spanning the space between the journal boxes 12 and connected by spaced columns 18 to form in the intermediate portion of each frame a bolster opening 19. The lower portion of that opening is enlarged as indicated at 20 to permit the end portion of the bolster to be received within the columns and then raised to normal operative position and supported on the springs 15 as is common in truck construction.

Each end portion of the bolster 14 is modified from standard practice to form pockets 21 to receive friction shoes 22, each having a planar face for engagement with a flat wear surface on the side frame, and other pockets 23 for friction shoe springs 24, the latter being shown with their outer ends cooperating with the friction shoes 22 and their inner ends cooperating with follower blocks 25, each having forked shanks 26 (Fig. 3) projecting inwardly through an opening 27 in the bolster and provided with an anti-friction roller 28 journaled on a pintle 29.

The rollers are adapted to cooperate with an adjuster, generally designated 30, depending from and swiveled to the intermediate portion of the compression member 17 of the side frame and extending through a slot 31 in the bolster.

The adjuster 30 consists of a hardened steel plate 32 having formed on both sides of the lower end thereof a cam track or surface 33 which may be of any desired configuration. It will be seen that when the bolster moves downwardly with respect to the side frame because of increased load, the adjuster 30 moves upwardly relative to the bolster, causing the rollers 28 to ride downwardly upon the enlarged bottom portion of the adjuster 30, thereby causing the friction shoes 22 to bear with greater force against the wear plates 34 which are secured to the inner faces of the colums 18. The adjuster 30 acting with the follower blocks 25 constitute a force transmitting device with a part of the device necessarily on the side frame of the truck and another part on the bolster or some member moving with the bolster so that relative movement between the bolster and the side frame will cause the friction shoes 22 to bear against the wear plates 34 with more or less force, depending upon the direction of movement of the bolster.

Before describing in more detail the various cam faces which may be employed with the adjuster 30, it will be helpful to consider first the graphical illustrations of Figs. 7 to 11, inclusive.

Figure 7:
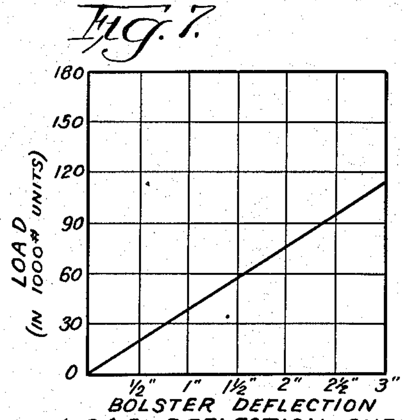

Fig. 7 shows a typical load deflection curve for a truck using constant rate springs. Since equal increments of load on the bolster spring produce equal increments of bolster deflection, the load deflection curve is a straight line, and obviously the slope of such line may be predetermined by proper choice of spring characteristics.

Figure 8:
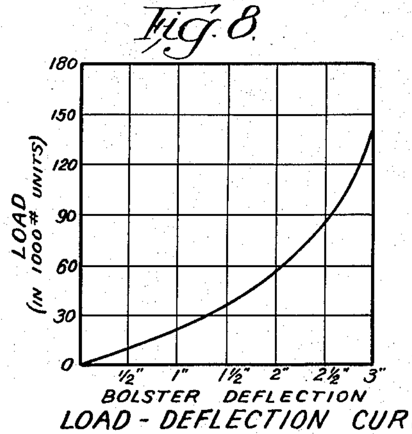

In Fig. 8 is shown a typical load deflection curve for variable rate springs, such, for example, as the type disclosed in Holland Patent No. 2,387,264, issued October 23, 1945. In this particular patent, the spring is given a pre-selected variable rate throughout its operating range in order that its natural frequency will be the same for all deflections of the spring between minimum and maximum bolster loadings. The curve in Fig. 8 is not intended to be the precise curve for a spring made according to Holland 2,387,264, but rather illustrates the fact that with a variable rate spring, the load deflection curve veers upwardly, indicating an increasing rate for equal increments of load.

Figure 9:
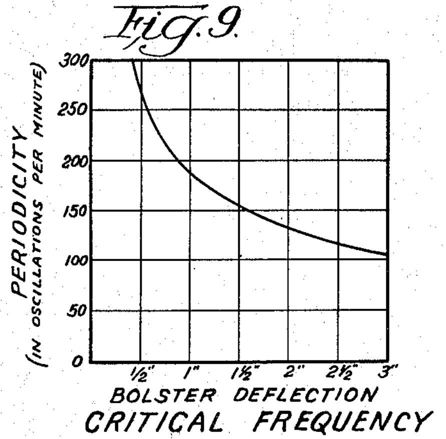

Fig. 9 illustrates the manner in which periodicity or frequency of oscillation varies with bolster deflection in the case of constant rate springs. There is some advantage in having the adjuster plate 32 shaped so that the friction forces on the bolster are functionally related to changes in the critical frequency of the bolster spring under varying loads, so that the damping effect is related to the bolster deflection which in turn is functionally related to the natural frequency of the spring system. By having the adjuster increase the pressure of the friction shoes 22 against the wear plates 34 as the bolster rises and at a rate which is functionally related to the increase in the natural period of oscillations, the oscillations of the springs 15 are advantageously damped as desired.

Figure 10:
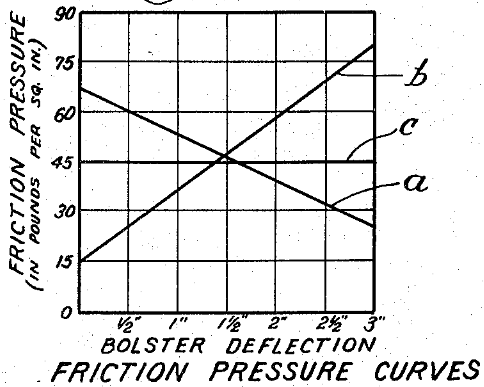

In Fig. 10, the friction pressure curves for various types of conventional stabilizers are illustrated. For example, curve *a* shows how friction pressure decreases as bolster deflection increases in the so-called "snub up" type of stabilizer. Conversely, curve *b* shows how friction pressure increases as bolster deflection increases in the so-called "snub down" type of stabilizer. A third class of stabilizers is characterized by constant friction pressure throughout the range of bolster travel, and the friction pressure curve of this type of stabilizer is indicated by the line *c*.

It will be noted that in curves *a* and *b* the slopes of these lines are determined by the wedge angles and the wedge springs that are employed, and once the wedges and springs have been preselected, assuming constant rate springs, a straight line function necessarily results.

Figure 11:
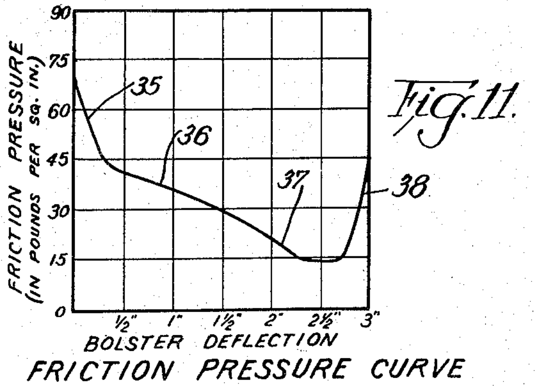

In contrast to the friction pressure curves of Fig. 10, there is shown in Fig. 11 a friction pressure curve which might be said to represent a highly desirable, if not the most desirable, relationship between friction pressure and bolster deflection. The curve indicates that at minimum load and maximum load the friction pressure is relatively high, so that the stabilizer acts as both a "snub up" and "snub down" type of stabilizer. Thus, at minimum load or zero deflection, the friction pressure might amount to 70 pounds per square inch, this value dropping to 40 pounds per square inch for one-half inch of bolster deflection. This portion of the curve is indicated at 35. From light load to medium load, the rate of friction pressure might decrease at a rate corresponding to the slope of that portion of the curve indicated at 36, assuming 1½ inches to be the bolster deflection for medium load. From medium load to full load, the rate of friction pressure decrease is preferably somewhat greater than from light load to medium load, and this greater rate of decrease is indicated by the portion 37 of the curve. This latter portion of the curve merges with a portion 38, indicating a sharp increase in friction pressure when the bolster deflection reaches its maximum of 3 inches, so that there is a strong damping action when the spring approaches maximum deflection. Between the portions 37 and 38 is a relatively flat portion indicating that at or near full load a substantially constant damping force is applied. It should be understood that the absolute values indicated in Figs. 10 and 11 for friction pressures are purely illustrative and may be deemed units rather than specific values of friction pressure in terms of pounds per square inch.

Although Figs. 5 and 6 are intended to indicate by way of example typical cam shapes for 50-ton spring nests with $1\frac{1}{16}$ inches and $2\frac{1}{2}$ inches of travel respectively, the application of the friction pressure curve of Fig. 11 to these embodiments of the invention is readily apparent. For example, the rate of friction pressure increase from full load to medium load is greater than the rate of friction pressure increase from medium load to light load, and the portion of the cam surface above the line indicating light load produces a sharp increase in friction pressure corresponding to the portion 35 of the curve in Fig. 11. Likewise, below the line indicating full load in Figs. 5 and 6, there is a portion of the curve which permits relative freedom of action to maintain the cushioning characteristics of the spring (i. e., relative constant friction force for this portion of bolster travel), and thereafter the cam surface has a relative steep slope to absorb excessive impacts under full load, this portion of the cam surface corresponding to the portion 38 of the curve of Fig. 11.

The infinite range of possibilities for obtaining the desired friction pressure for any preselected loading of the car is readily apparent from the fact that the cam surfaces of the actuator 30 may be given any configuration desired. The particular configuration shown in Figs. 5 and 6, which conforms in general to the desired characteristics indicated in Fig. 11, is but an illustration of the many permutations that are possible.

Figures 12, 13, 14, 15, 16:
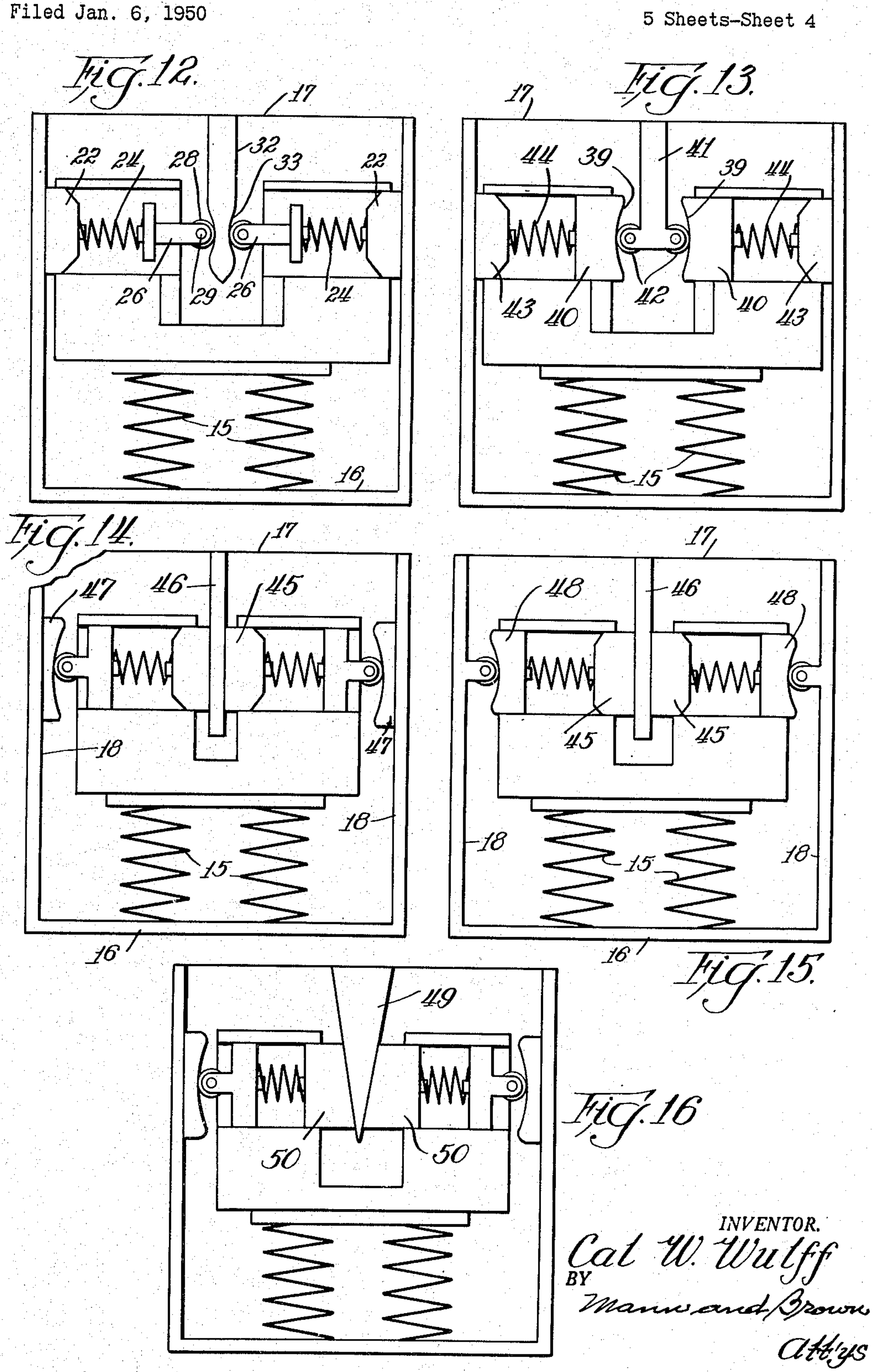

Figs. 12 to 16, inclusive, show various modifications within the scope of this invention. Fig. 12 corresponds to the embodiment of the invention shown in Figs. 1 to 6, inclusive, and in Fig. 13 a similar arrangement is shown, except that in this case, the cam faces 39 are formed on the follower blocks 40, and the actuator 41 carries rollers 42 which cooperate with the cam faces 39 to apply the desired pressure to the friction shoes 43 through springs 44.

Instead of having the cam track at the center of the bolster, it may be associated with the columns 18. This is shown diagrammatically in Figs. 14 and 15, in which friction shoes 45 bear upon a downwardly extending wear plate 46 carried by the compression member 17 of the side frame (and which plate may therefore be deemed part of the side frame), and the cam face may be applied to shoes 47 affixed to the columns 18 as shown in Fig. 14, or it may be part of the followers 48 which move with the bolster, as shown in Fig. 15.

Various compounded effects may be obtained by using cam surfaces associated with the columns, as shown in Figs. 14 and 15, and combining with this structure a tapered wedge 49 suspended from the member 17 of the side frame (and which wedge also may be deemed a part of the side frame) and cooperating with wedge shoes 50 in the bolster.

Still other modifications of the invention are shown in Figs. 17 to 20, inclusive. In Fig. 17, the actuator 51 is in the form of a rack which cooperates with toothed pinion cams 52 carried by the bolster and shaped to provide the desired change in friction shoe pressure as the actuator 51 moves relative to the bolster.

In Fig. 18, a rolling cam arrangement is illustrated, with the actuator 53 cooperating with hinged followers 54 to provide a rolling cam action, producing resultant outwardly directed forces of the magnitude desired for different bolster deflections.

Likewise, in Fig. 19, a cam 55, which may be of any desired shape, is supported on a shaft 56 rotatably mounted in the bolster and actuated by an arm 57 secured to the compression member 17 of the side frame. By properly shaping the cam 55, the resultant outward pressure on the friction shoes 58 may be controlled according to the desired design characteristics.

In all of the embodiments of the invention heretofore described, it is contemplated that the springs 24 and other like springs interposed between the friction shoes and the follower member are constant rate springs, i. e., for equal increments of deflection, they will produce equal increments of friction pressure. It is, of course, possible to use a variable rate spring, for example, of the type disclosed in Holland Patent No. 2,387,264, and with or without using a cam shaped actuator in the types disclosed in Figs. 12 through 19, inclusive, obtaining a variable rate friction pressure curve, assuming, of course, that some type of wedge arrangement is used for compressing the springs which back up the friction shoes. The wedge arrangement comprising the wedge 49 and wedge shoes 50 of Fig. 16 is illustrative.

In Fig. 20, there is shown a somewhat different arrangement for obtaining a changing rate of friction pressure for different bolster deflections. In the arrangement shown in this figure, the friction shoes 59 are yieldingly held apart by a plurality of springs—60, 61, and 62. The friction shoes 59 have inclined faces 63 adapted to bear against similarly inclined faces of wear shoes 64 which are secured to the bolster columns 65, and which in this embodiment of the invention constitute camming members.

The free lengths of the springs 60, 61 and 62 are such that under maximum load only the spring 60 urges the shoe 59 apart. For a lesser deflection of the bolster, springs 60 and 61 are active, and for still lesser deflections of the bolster, all three springs are active. By this nesting of springs, the slope of the wedge or friction shoes 59 may be selected to give a relatively low rate of friction pressure decrease for given increments of bolster deflection, and the springs 61 and 62 may be relied upon to provide increased rates for lesser bolster deflections. Obviously variable rate springs, such as shown in Holland Patent No. 2,387,264 may be employed if desired, in which case, a single variable rate spring may be substituted for the three springs shown in Fig. 20, or each of the three springs may be of the variable rate type.

In all embodiments of the present invention, the most important distinction from prior damping devices or the like lies in the provision of means for obtaining nonlinear relationships between friction pressure and bolster deflection. Furthermore, in most of the embodiments of the invention, the relationship may be infinitely variable so that for any given bolster deflection, the most desirable friction pressure may be applied to dampen movement of the bolster relative to the side frame.

Figures 2, 3:
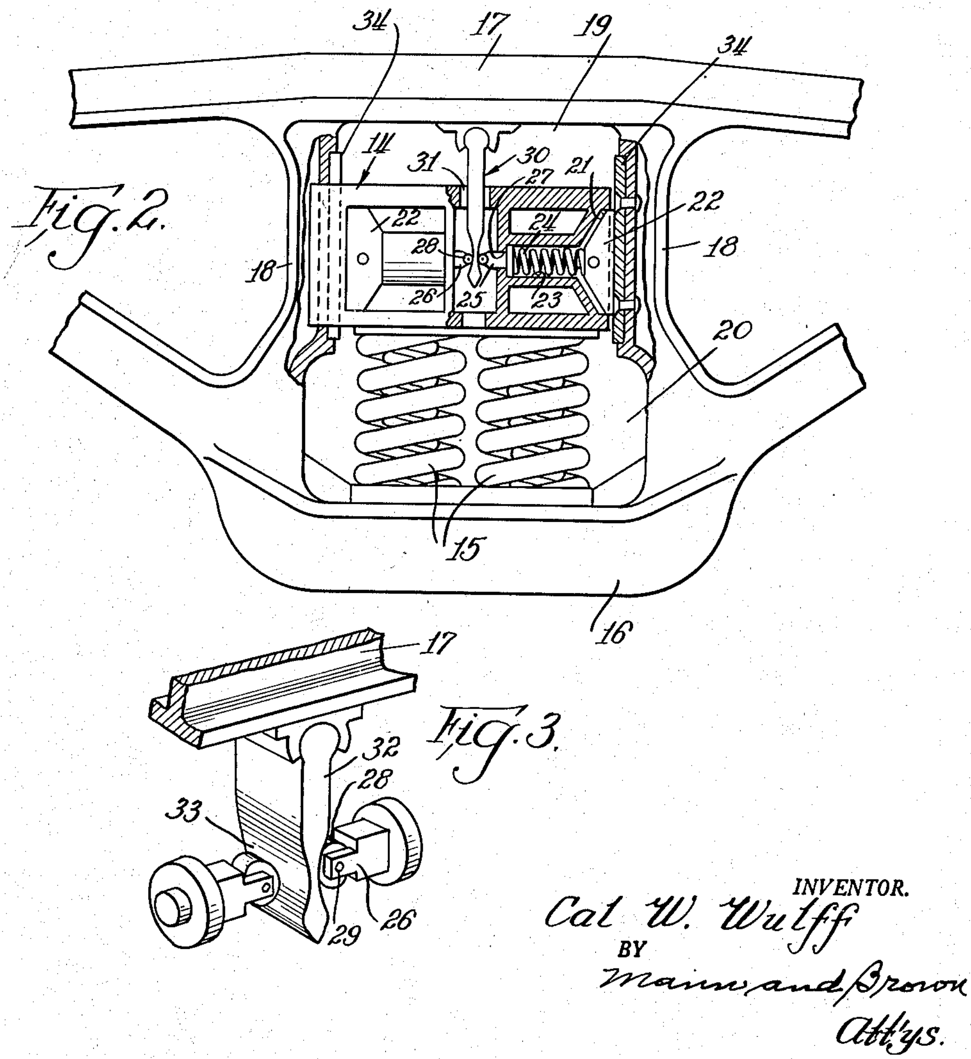
Fig. 2 is an enlarged fragmentary side elevational view of the car truck shown in Fig. 1 with parts of the bolster and side frame being shown in section.
Fig. 3 is a perspective view showing the centrally arranged camming device for varying the pressure applied to the friction shoes.
Figure 4:
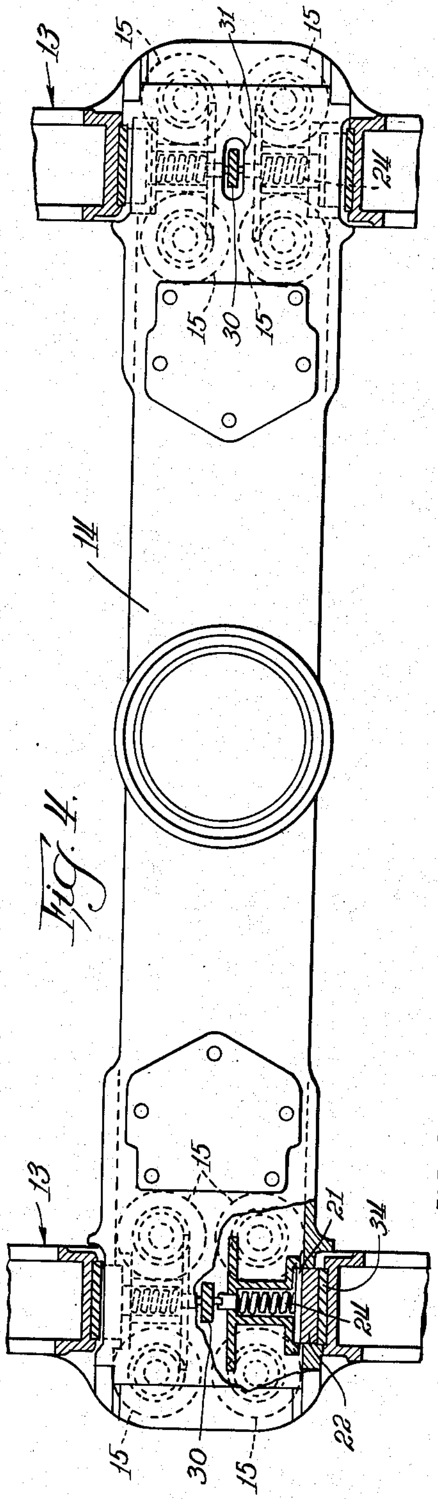
Fig. 4 is a horizontal sectional view looking down upon the truck bolster and showing a part of the damping device in section.

Throughout the appended claims, it should be understood that engagement of the friction shoes with the side frame is intended to mean any part of the side frame, or any part or member moveable with the side frame, such for example, as the adjustor 30 in Fig. 2. Also it should be understood that the term "cam member" is used in a broad sense and includes such devices, for example, as those devices shown in Figures 17–20 for compressing the friction shoe springs in response to relative movement between the bolster and side frame.

I claim:

1. In a truck, a side frame having a bolster opening, a load-supporting bolster having an end received within said opening, a spring for supporting said bolster end within said opening in a vertical position of equilibrium with reference to said side frame dependent upon the loading of said bolster, a planar face friction shoe carried by said bolster end arranged to engage a flat wear surface on the side frame and dampen oscillations of said bolster away from its equilibrium position, and a variable rate device including an element associated with said side frame and another element movable with the bolster and interacting with said first element to variably translate vertical movement of the bolster relative to the side frame to a lateral force applied to said friction shoe to thereby vary the pressure of said shoe against said side frame in a non-linear relationship to the loading of the bolster with the greatest pressure being exerted on said shoe when the bolster is adjacent the limit of its travel away from equilibrium.

2. In a truck, a side frame having a bolster opening, a load-supporting bolster having an end received within said opening, a spring for supporting said bolster end within said opening in a vertical position of equilibrium with reference to said side frame dependent upon the loading of said bolster, a planar face friction shoe carried by said bolster end arranged to engage a flat wear surface on the side frame and dampen oscillations of said bolster away from its equilibrium position, and a variable rate device including an element associated with said side frame and another element movable with the bolster and interacting with said first element to variably translate vertical movement of the bolster relative to the side frame to a lateral force applied to said friction shoe to thereby vary the pressure of said shoe against said side frame in a manner such that within specified limits of static load, the friction pressure on the shoe is non-linear and varies in substantially direct relation to the change in natural frequency of vibration of the supporting spring occasioned by changes in said static loading.

3. In a truck, a side frame having a bolster opening, a load-supporting bolster having an end received within said opening, a spring for supporting said bolster end within said opening in a vertical position of equilibrium with reference to said side frame dependent upon the loading of said bolster, a planar face friction shoe carried by said bolster end arranged to engage a flat wear surface on the side frame and dampen oscillations of said bolster away from its equilibrium position, and means associated with said side frame and said bolster for varying the pressure of said shoe against said side frame in a non-linear relationship to the loading of the bolster, said means including a curved cam member and a follower member, one being connected to and movable with the bolster and the other being connected to and movable with the side frame, and a spring interposed between said friction shoe and the member movable with the bolster.

4. In a truck, a side frame having a bolster opening, a load-supporting bolster having an end received within said opening, a spring for supporting said bolster end within said opening in a vertical position of equilibrium with reference to said side frame dependent upon the loading of said bolster, planar face friction shoes on opposite sides of said bolster end arranged to engage adjacent flat wear portions of said side frame and thereby to dampen oscillations of said bolster away from its equilibrium position, and means for varying the pressure of said shoes against said side frame in a manner such that, within specified limits of static load, the friction pressure on the shoes varies in substantially direct relation to the change in natural frequency of vibrations of the supporting spring occasioned by changes in said static loading, said means including friction shoe springs extending inwardly from said shoes, a member connected to and movable with the side frame, and a device associated with and cooperating with said member for compressing the said friction shoe springs in nonlinear relation to vertical movement of the bolster.

5. In a truck, a side frame having a bolster opening, a load-supporting bolster having an end received within said opening, a spring for supporting said bolster end within said opening in a vertical position of equilibrium with reference to said side frame dependent upon the loading of said bolster, a planar face friction shoe carried by said bolster end arranged to engage a flat wear surface on the side frame and dampen oscillations of said bolster away from its equilibrium position, and a variable rate device including an element associated with said side frame and another element movable with the bolster and interacting with said first element to variably translate vertical movement of the bolster relative to the side frame to a lateral force applied to said friction shoe to thereby vary the pressure of said shoe against said side frame in a manner such that within specified limits of static load, the friction pressure on the shoes varies in a predetermined non-linear relationship to the loading of the bolster and beyond those limits the friction pressure is sharply increased.

6. In a truck, a side frame having a bolster opening, a load-supporting bolster having an end received within said opening, a spring for supporting said bolster end within said opening in a vertical position of equilibrium with reference to said side frame dependent upon the loading of said bolster, a planar face friction shoe carried by said bolster end arranged to engage a flat wear surface on the side frame and dampen oscillations of said bolster away from its equilibrium position, and means associated with said side frame and said bolster for varying the pressure of said shoe against said side frame in a non-linear relationship to the loading of the bolster, said means including a member connected to and movable with the side frame, a friction shoe spring interposed between the friction shoe and said member, and a device associated with the member and acting upon said friction shoe spring for changing the compression of the friction shoe spring in nonlinear relation to the vertical movement of the bolster, said device comprising a cam of varying slope and a follower riding on the cam.

7. In a truck, a side frame having a bolster opening, a load-supporting bolster having an end received within said opening, a spring for supporting said bolster end within said opening in a vertical position of equilibrium with reference to said side frame dependent upon the loading of said bolster, friction shoes on opposite sides of said bolster end arranged to engage adjacent portions of said side frame and thereby to dampen oscillations of said bolster away from its equilibrium position, and means associated with said side frame and said bolster for varying the pressure of said shoes against said side frame in a nonlinear relationship to the loading of the bolster, said means including friction shoe springs extending inwardly from said shoes, a member connected to and movable with the side frame, and a device associated with said member and acting upon said friction shoe spring for compressing the said friction shoe springs in nonlinear relationship to vertical movement of the bolster with the greatest pressure being exerted on said shoe when the bolster is adjacent the limit of its travel away from equilibrium.

8. In a truck, a side frame having a bolster opening, a load-supporting bolster having an end received within said opening, a spring for supporting said bolster end within said opening in a vertical position of equilibrium with reference to said side frame dependent upon the loading of said bolster, planar face friction shoes on opposite sides of said bolster end arranged to engage adjacent flat portions of said side frame and thereby to dampen oscillations of said bolster away from its equilibrium position, and means associated with said side frame and said bolster for varying the pressure of said shoes against said side frame in a non-linear relationship to the loading of the bolster, said means including friction shoe springs extending inwardly from said shoes, and a device acting upon said friction shoe springs for compressing the said friction shoe springs in non-linear relationship to vertical movement of the bolster, said device including a member, movable with the side frame, and having cam surfaces on opposite sides thereof, and follower blocks interposed between the friction springs and the cam surfaces.

9. Apparatus for damping the oscillations of suspension springs that support the bolster on the side frame of a railway car truck, said apparatus including a planar face friction shoe mounted for movement with the bolster and frictionally engaging a flat wear surface on the side frame, and means for varying the pressure between said friction shoe and side frame in nonlinear relation to the loading of the bolster, said means including a curved cam member and a follower member, one movable with the bolster and the other movable with the side frame, and a spring interposed between said friction shoe and the member movable with the bolster.

10. Apparatus for damping the oscillations of suspension springs that support the bolster on the side frame of a railway car truck which includes opposed friction shoes to move with the bolster and frictionally engage the side frame and thereby dampen the oscillations of the bolster away from its equilibrium position, and means for varying the pressure on said friction shoes in a manner such that within specified limits of static load the friction pressure of the shoes varies in substantially direct relation to the change in natural frequency of vibration of the supporting spring caused by changes in the static loading, said means including friction shoe springs extending inwardly from said opposed shoes, a member movable with the side frame and a device associated with said member and acting upon said friction shoe springs for compressing the said friction shoe springs in nonlinear relation to vertical movement of the bolster.

11. Apparatus for damping the oscillations of suspension springs that support the bolster on the side frame of a railway car truck which includes a planar face friction shoe to move with the bolster and frictionally engage a flat wear surface on the side frame and dampen oscillations of said bolster away from its equilibrium position, and means for varying the pressure on said shoe in nonlinear relation to the loading of the bolster, said means including a member to move with the side frame, a friction shoe spring interposed between the friction shoe and said member, and a device associated with the member and acting upon said friction shoe spring for changing the compression of the friction shoe spring in nonlinear relation to the vertical movement of the bolster, said device comprising a cam of varying slope and a follower riding on the cam.

12. Apparatus for damping the oscillations of suspension springs that support a bolster member on a side frame member of a railway car truck which includes opposed planar face friction shoes to move with the bolster and frictionally engage a flat wear surface on the side frame and thereby dampen oscillations of said bolster away from its equilibrium position, and cam means for varying the pressure on said friction shoes in nonlinear relation to the loading of the bolster, said cam means including friction shoe springs extending inwardly from said shoes, an element movable with one of said members and a second element movable with said other member and having camming action with said first element for compressing said friction shoe springs in nonlinear relationship to vertical movement of the bolster with the greatest pressure being exerted on said shoe when the bolster is adjacent the limit of its travel away from equilibrium.

13. Apparatus for damping the oscillations of suspension springs that support the bolster on the side frame of a railway car truck which includes opposed friction shoes to move with the bolster and frictionally engage the side frame and thereby dampen oscillations of said bolster away from its equilibrium position, and means for varying the pressure between said friction shoes and side frame in nonlinear relation to the loading of the bolster, said means including friction shoe springs extending inwardly from said shoes, and a device for compressing the said friction shoe springs in non-linear relation to vertical movement of the bolster, said device including a member movable with the side frame and having cam surfaces on opposite sides of said member, and follower blocks interposed between the friction springs and the cam surfaces.

14. Apparatus for damping the oscillations of suspension springs that support the bolster on the side frame of a railway car truck which includes a planar face friction element to move with the bolster and frictionally engage a flat wear surface on the side frame, and a variable rate, force-transmitting device for varying the force exerted by said friction element against said side frame, said device including a cam member and a spring member at least one of which members is mounted for movement with the bolster, said members coacting to change the force with which the friction element is urged against the side frame upon selected relative movement between the bolster and the side frame, one of said members being constructed and arranged so that for a selected portion of bolster travel and for equal increments of relative movement between the bolster and the side frame within the said selected portion of bolster travel, the friction pressure between the friction element and side frame will vary at a non-constant rate, with the greatest pressure being exerted on said friction element when the bolster is adjacent the limit of its travel away from equilibrium whereby the damping action of the device is characterized by its nonlinear relationship to the loading of the bolster.

15. The apparatus as set forth in claim 14 in which the spring member includes a series of springs arranged in parallel and having different effective lengths for sequential action as relative movement between the bolster and side frame progresses.

16. The apparatus as set forth in claim 14 in which the spring member includes a spring element having a variable rate.

17. The apparatus as set forth in claim 14 in which the cam member comprises an adjustor plate secured to the side frame and having a cam face extending into a pocket in the bolster, and against which a follower bears for applying pressure to the friction element in conformity with the position of the follower on said cam face.

18. The apparatus as set forth in claim 14 in which the cam member comprises an adjustor plate secured to the side frame at one side of the bolster, said plate having a non-planar cam surface against which a follower carried by the bolster rides, and means for transmitting forces from the follower through said spring member to said friction element.

19. The apparatus as set forth in claim 18 in which said friction element has a wedge face for cooperation with a complementary wedge face moving with the side frame.

20. In a railway truck, a side frame having spaced column members forming a bolster opening, a bolster member spring supported on said side frame and extending into said opening, means for dampening the vertical oscillations of said bolster member with respect to said side frame, comprising a device carried by one of said spaced column members and a device carried by said bolster member, one of said devices having thereon a vertically disposed non-linear cam surface, the other of said devices comprising a follower and a spring for biasing said follower into engagement with said cam surface, said one of said devices and said other of said devices being so arranged with respect to one another that said follower traverses said cam surface as said bolster oscillates.

21. In a railway car truck, the combination with a side frame provided with bolster guide members, of a truck bolster member resiliently supported on said side frame between said guide members, and means for dampening the vertical oscillations of said bolster comprising a device mounted on said bolster member and another device mounted on one of said guide members, one of said devices comprising a cam plate presenting a vertically curved surface, the other of said devices comprising a horizontally slidable block, a roller on said block, springs reacting between the block and the member on which said other of said devices is mounted so as to press said roller into engagement with said curved surface, said devices being so arranged with respect to one another that said roller travels said curved surface as said bolster oscillates.

22. In a railway truck, a side frame having a bolster opening between spaced columns, a bolster spring-supported on said side frame in said opening, means for dampening the vertical oscillations of said bolster with respect to said side frame comprising a device carried by said side frame and a device carried by said bolster, one of said devices comprising a cam presenting a vertically curved surface, the other of said devices comprising a block slidable substantially horizontally, a roller on said block, and springs reacting between said block and the member on which the other of said devices is mounted so as to press said roller into engagement with said curved surface, said devices being so arranged with respect to one another that said roller traverses said curved surface as the bolster oscillates.

CAL W. WULFF.

References Cited in the file of this patent

UNITED STATES PATENTS

| Number | Name | Date |
|---|---|---|
| 1,101,993 | Bowen | June 30, 1914 |
| 1,167,848 | Sears | Jan. 11, 1916 |
| 1,243,007 | Taylor | Oct. 16, 1917 |
| 1,695,086 | Cardell | Dec. 11, 1928 |
| 2,141,767 | Camp | Dec. 27, 1938 |